No. 645,570. Patented Mar. 20, 1900.
C. E. SCRIBNER.
TELEPHONE APPLIANCE.
(Application filed June 15, 1896.)
(No Model.)
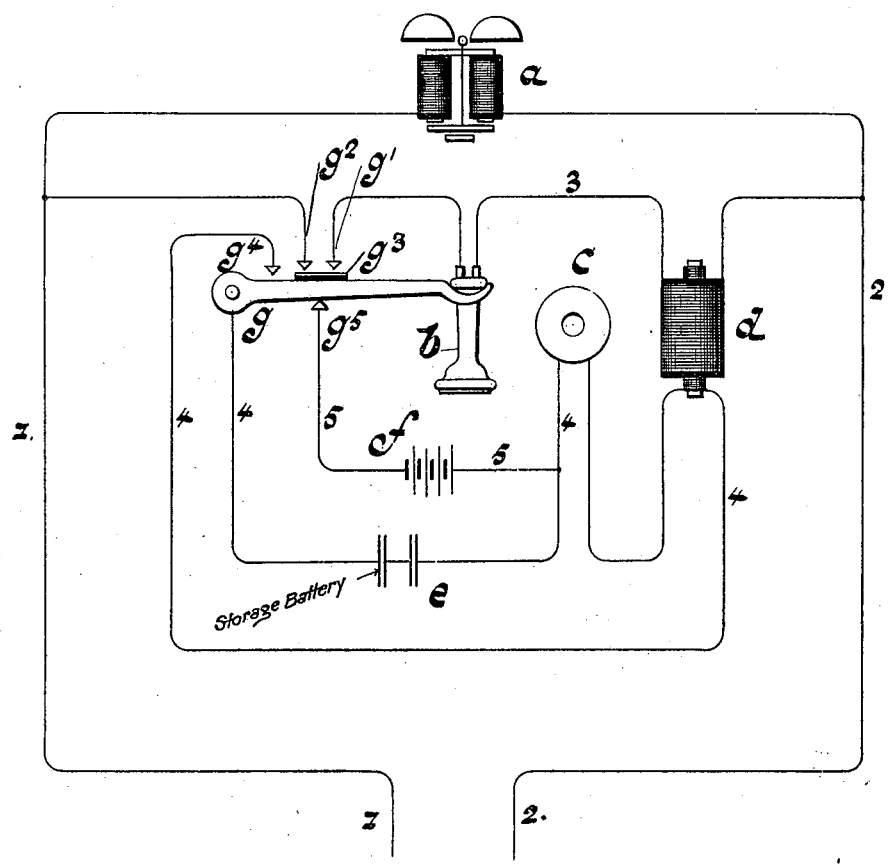
Witnesses:
John W. Sinclair
D. H. E. Tanner
Inventor:
Charles E. Scribner
by: Barton & Brown Attys.

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

TELEPHONE APPLIANCE.

SPECIFICATION forming part of Letters Patent No. 645,570, dated March 20, 1900.

Application filed June 15, 1896. Serial No. 595,544. (No model.)

*To all whom it may concern:*

Be it known that I, CHARLES E. SCRIBNER, a citizen of the United States, residing at Chicago, in the county of Cook and State of Illinois, have invented a certain new and useful Improvement in Telephone Appliances, (Case No. 426,) of which the following is a full, clear, concise, and exact description, reference being had to the accompanying drawing, forming a part of this specification.

My invention concerns the operation of telephones at substations, being an appliance for supplying current to the transmitting-telephone.

It consists in a new arrangement of secondary and primary batteries, together with switches and regulating apparatus for supplying ample and uniform current to the telephone in order to attain a permanent high efficiency in telephonic transmission therefrom.

It has been common in the practice of telephony to employ primary or secondary batteries at the telephone-substations for supplying current to the transmitting-telephones. All batteries of the former type are, however, subject to rapid polarization and to a continuous decrease in efficiency when kept on a closed circuit for any considerable length of time. Hence when such batteries are used in connection with telephones which are in frequent or continued operation the distinctness and loudness of the transmitted telephonic currents rapidly diminish during the use of the instrument. The secondary storage battery has been found most desirable for supplying current to the substation-microphone, since such a battery maintains its full electromotive force until nearly exhausted and has such a low internal resistance that it is able to supply a practically-unlimited current to the transmitter. Storage-cells have heretofore, however, been subject to inconveniences in maintaining their charged condition. In some instances the cells have been charged over the conductors of the telephone-line. This method, however, involves considerable waste of energy and has also various disadvantages in respect to the signaling appliances associated with the line.

My improvement consists in providing a storage battery for supplying a current to the transmitter and in continuously charging the storage-cells during their idleness by means of primary batteries associated with them, the storage-cells and primary batteries being so related to each other as respects their electromotive forces that the current supplied by the primary cells to the storage-cells shall be just sufficient to maintain the fully-charged condition of the latter.

I am aware that it is not new to employ primary batteries for charging storage batteries. My present invention consists, however, in the combination, with a transmitting-telephone, of secondary supply-batteries and primary charging-batteries in connection with a switch for controlling the supply of the current of the storage battery to the transmitter and means for preventing the too-rapid discharge of the primary cells.

The invention is illustrated in the accompanying drawing, of which the figure shows the usual telephonic and signaling appliances at a telephone-substation, together with a secondary supply-battery for the transmitting-telephone, a primary battery for charging the secondary cells, and a switch controlling the transmitter-circuit and the charging-circuit. I have not deemed it necessary to represent the central-office terminal or apparatus of the telephone-line, since the apparatus at the substation may be used in connection with any of the well-known central-office appliances.

The apparatus at the substation comprises a polarized signal-bell $a$ of high resistance, a receiving-telephone $b$, a transmitting-telephone $c$, an induction-coil $d$ therefor, a supply-battery $e$ for the transmitter and a charging-battery $f$, and a telephone-switch $g$ controlling the circuits.

The call-bell $a$ is included permanently in the line-circuit 1 2. The receiving-telephone $b$, together with the secondary winding of the induction-coil $d$, is traversed by a bridge 3 of the line-circuit, which is ordinarily open at switch-contact $g' g^2 g^3$ of the telephone-switch. The transmitting-telephone $c$, the primary winding of the induction-coil $d$, and the secondary battery $e$ are associated in a local circuit 4, which also is controlled by a contact-point $g^4$ of lever $g$ of the telephone-switch.

The primary batteries $f$ are connected in a shunt or parallel circuit 5 of the storage battery $e$, this circuit also being controlled by a contact $g^5$ of the telephone-switch.

The transmitting-telephone ordinarily in use is adapted to work to the best advantage with a battery having an electromotive force somewhat in excess of four volts. I therefore consider two cells of a storage battery of Planté or any other well-known type having a normal electromotive force of two and one-tenth volts per cell as a suitable supply-battery. The electromotive force of such a group of cells will therefore be normally four and two-tenths volts. This may rise, however, after continued charging to four and four-tenths volts or may fall after continued heavy use to three and eight-tenths volts or even less. For charging these storage-cells I prefer to use four cells of some battery having a sal-ammoniac solution and possessing an electromotive force when fresh of one and five-tenths volts per cell. The primary cell may have a moderately-high internal resistance, as much as eight-tenths or one ohm. The cell may be of such construction that it may polarize quickly when a heavy current is taken from it; but it should be adapted to supply a slight current for a long time without any excessive diminution of its electromotive force.

With a particular group of cells having the characteristics mentioned the storage battery had been fully discharged and the primary charging-batteries applied. A current of seven-tenths ampere flowed for a very short time into the storage battery. The storage-cells very quickly became polarized, however, their electromotive force rising to four volts and that of the primary cells in the meantime falling slightly. A current approximating one-tenth ampere then flowed for a considerable time, gradually diminishing to three-hundredths ampere as the storage batteries approached a fully-charged condition. Obviously the relation between the electromotive force of the storage battery and that of the primary battery must be such that the total energy supplied by the charging-batteries shall be somewhat in excess of the energy used from the supply-battery. The average use of the telephone being about one hour per day and the average current taken thereby being three-tenths ampere, the total current used by the transmitting-telephone will amount to three-tenths ampere hour per day. Then the charging-battery may be active for twenty-three hours per day and should in that time supply somewhat more than three-tenths ampere hour.

During the idleness of the telephone the circuit 5 is closed at the switch-contact $g^5$, the circuit being complete through the storage-cells. When the receiving-telephone is removed from its switch-hook $g$ for use, the latter interrupts the charging-circuit and at the same time closes the circuit 3, including the receiving-telephone, and also completes the local circuit 4 of the storage battery through the transmitting-telephone.

I claim as my invention and desire to secure by Letters Patent—

The combination at a substation of a telephone-exchange of a transmitting-telephone of low resistance and a supply storage battery therefor, a primary battery, a circuit of the storage battery through the telephone, a circuit of the primary battery through the storage battery, and a telephone-switch adapted to break the connection of the primary battery with the storage battery and to close the circuit of the storage battery with the telephone, the normal electromotive force of the primary battery being substantially equal to the maximum electromotive force of the storage battery, substantially as described.

In witness whereof I hereunto subscribe my name this 13th day of May, A. D. 1896.

CHARLES E. SCRIBNER.

Witnesses:
ELLA EDLER,
LUCILE RUSSELL.